United States Patent
Lee et al.

(10) Patent No.: US 9,411,360 B2
(45) Date of Patent: Aug. 9, 2016

(54) METHOD TO MANAGE CURRENT DURING CLOCK FREQUENCY CHANGES

(71) Applicant: Apple Inc., Cupertino, CA (US)

(72) Inventors: Jong-Suk Lee, Sunnyvale, CA (US); Wei-Han Lien, San Jose, CA (US); Shih-Chieh R. Wen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 217 days.

(21) Appl. No.: 14/153,296

(22) Filed: Jan. 13, 2014

(65) Prior Publication Data

US 2015/0198966 A1  Jul. 16, 2015

(51) Int. Cl.
*G06F 1/08* (2006.01)
*G06F 1/32* (2006.01)

(52) U.S. Cl.
CPC . *G06F 1/08* (2013.01); *G06F 1/324* (2013.01)

(58) Field of Classification Search
CPC .................................. G06F 1/08; G06F 1/324
See application file for complete search history.

(56) References Cited

U.S. PATENT DOCUMENTS

| | | | |
|---|---|---|---|
| 6,223,297 B1 | 4/2001 | Inoue | |
| 6,988,217 B1 | 1/2006 | Madrid et al. | |
| 7,013,406 B2 | 3/2006 | Naveh et al. | |
| 7,210,054 B2 * | 4/2007 | Jahagirdar | G06F 1/08 713/400 |
| 7,865,755 B2 | 1/2011 | Engl et al. | |
| 8,181,049 B2 | 5/2012 | Rozen et al. | |
| 8,892,922 B2 * | 11/2014 | Frank | G06F 1/324 323/318 |
| 2013/0120037 A1 * | 5/2013 | Tripathi | G06F 1/08 327/156 |
| 2015/0113304 A1 * | 4/2015 | Kim | G06F 1/324 713/322 |

* cited by examiner

*Primary Examiner* — Thuan Du
(74) *Attorney, Agent, or Firm* — Meyertons, Hood, Kivlin, Kowert & Goetzel, P.C.

(57) ABSTRACT

A system for managing a change in a frequency of a clock signal, including a clock generator configured to output the clock signal, a clock divider coupled to the output of the clock generator, a processor configured to select the frequency of the clock signal, and a clock management circuit. The clock management circuit may be configured to set the clock generator to adjust the clock signal to the selected frequency. The clock management circuit may be further configured to adjust a divisor value of the clock divider in a plurality of steps in response to a determination the clock signal stabilized at the selected frequency. A new divisor value may be selected during each step in the plurality of steps and each step may occur after a given time period.

20 Claims, 5 Drawing Sheets

METHOD TO MANAGE CURRENT DURING CLOCK FREQUENCY CHANGES

BACKGROUND

1. Technical Field

This invention is related to the field of integrated circuit implementation, and more particularly to the implementation of clock management circuits.

2. Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Some SoC designs may support a variety of operational frequencies for a variety of reasons. For example, a specific frequency may be required for a certain communications protocol, such as, for example, Universal Serial Bus (USB) or Ethernet. In other embodiments, a system frequency may be increased or decreased to either increase performance of the system or reduce power consumption of the system depending on the needs of the system at any given time. In order to support adjustable frequencies, clock circuits may include a closed loop clock generating circuit such as, for example, a Phase-Locked Loop (PLL) or Frequency-Locked Loop (FLL). PLLs and FLLs may allow for a wide range of clock frequencies to be generated.

In some SoC designs, a voltage regulator may be used to maintain the voltage level of the power supply used throughout the SoC to prevent the voltage level from rising to a level which may damage the circuits. The method on which many voltage regulator designs operate may be susceptible to problems when there is a sudden change in the current consumption from the logic circuits to which the regulator is providing power. A sudden increase in current consumption may cause a temporary drop in the voltage level of the output of the regulator while the regulator adjusts to compensate. For example, if the SoC is consuming an average of 10 mA and the SoC suddenly increases power consumption to an average of 100 mA due to a performance shift such as an increase in the system frequency, then the output voltage of the voltage regulator may drop from the normal regulated voltage level until the regulator adjusts to compensate for the new current demand from the SoC and settles back to the normal regulated voltage level. This drop in the voltage level may be referred to as voltage droop. If the voltage droop results in a voltage level that is below a minimum voltage level necessary to operate the logic circuits, even briefly, a logic state within the logic circuits may be corrupted, which may lead to indeterminate behavior and a possible processing exception.

A method is desired in which a system frequency of an SoC may be modified from any supported frequency to any other supported frequency without risk of voltage droop of a voltage regulator falling below a minimum safe operating voltage level. Systems and methods for achieving a safe change in system frequency are presented below.

SUMMARY OF THE EMBODIMENTS

Various embodiments of a clock management circuit are disclosed. Broadly speaking, a system, an apparatus, and a method are contemplated in which the system includes a clock generator configured to output a clock signal at an initial frequency, a clock divider coupled to the output of the clock generator, a processor configured to select a new frequency of the clock signal, and a clock management circuit. The clock management circuit may be configured to set the clock generator to adjust the clock signal to the new frequency. The clock management circuit may be further configured to adjust a divisor value of the clock divider in a plurality of steps in response to a determination the clock signal stabilized at the new frequency. A new divisor value may be selected during each step in the plurality of steps and each step may occur after a given time period.

In a further embodiment of the system, the new frequency may be greater than the initial frequency and to adjust the divisor value in the plurality of steps, the clock management unit may be further configured to increase the divisor value in a first step of the plurality of steps and then to decrease the divisor value in subsequent steps of the plurality of steps.

In another embodiment, the clock management unit may be further configured to determine a number of steps in the plurality of steps based on a difference between the new frequency and the initial frequency.

In one embodiment, the clock divider may be configured to remove a number of clock pulses from the plurality of clock pulses during the given time period to divide the frequency of the clock signal by a divisor value. The clock divider may be further configured to determine a pattern for removing the number of clock pulses dependent upon a previously determined pattern.

BRIEF DESCRIPTION OF THE DRAWINGS

The following detailed description makes reference to the accompanying drawings, which are now briefly described.

Figure 1:
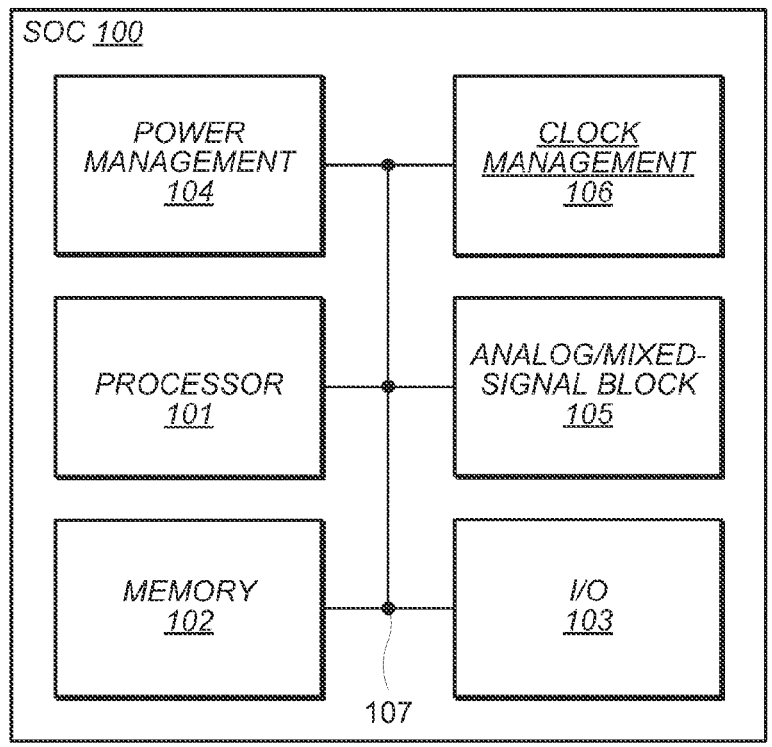
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor and one or more memories, which may integrate the function of a computing system onto a single integrated circuit. In some SoC designs, one or more clock frequencies may be temporarily reduced when the functional blocks coupled to the clock do not currently require a full speed clock. When a functional block does require a full speed clock, a processor in the SoC may configure a clock generating circuit such as a PLL or an FLL to increase the system clock signal to the required frequency.

When the SoC begins operating at the higher system clock frequency, the circuits within the SoC may begin consuming more current. If the frequency change occurs quickly, for example, within tens, hundreds, or even thousands of clock cycles, a sudden current increase may be induced to power the high activity state. Such a sudden increase in current consumption may cause a droop in the voltage level of the output of a power supply or voltage regulator as the regulator adjusts to compensate. As previously discussed, if the voltage level drops below a minimum voltage level necessary to operate the circuits, even briefly, a state within the circuits may be corrupted, which may lead to indeterminate behavior and a possible failure.

Conversely, a sudden decrease in a system clock frequency may result in an SoC suddenly consuming less current. In some power supplies and voltage regulators, a sudden decrease in current consumption may result in a temporary increase in the voltage level of the supply voltage. Some SoCs may be designed in a technology that may be sensitive to voltages that exceed a maximum operational voltage level. Such an overvoltage may cause indeterminate operation of affected circuits and may even cause damage to the circuits.

Various embodiments of a clock generation circuit and method to avoid sudden changes in system clock frequency are discussed in this disclosure. The embodiments illustrated in the drawings and described below may provide techniques for managing a clock generation circuit within a computing system that may prevent clock frequency excursions resulting in erroneous operation of circuits included in an SoC.

System-on-a-Chip Overview

A block diagram of an embodiment of an SoC is illustrated in FIG. 1. In the illustrated embodiment, the SoC 100 includes a processor 101 coupled to memory block 102, I/O block 103, power management unit 104, analog/mixed-signal block 105, and clock management unit 106, all coupled through bus 107. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores and may include one or more register files and memories.

In various embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magnetoresistive Random Access Memory (MRAM), for example. Some embodiments may include a single memory, such as memory block 102 and other embodiments may include more than two memory blocks (not shown). In some embodiments, memory block 102 may be configured to store program instructions that may be executed by processor 101. Memory block 102 may, in other embodiments, be configured to store data to be processed, such as graphics data, for example.

I/O block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 103 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 103 may be configured to perform the data processing necessary to implement an Ethernet (IEEE 802.3) networking standard.

Power management unit 104 may be configured to manage power delivery to some or all of the functional blocks included in SoC 100. Power management unit 104 may comprise sub-blocks for managing multiple power supplies for various functional blocks. In various embodiments, the power supplies may be located in analog/mixed-signal block 105, in power management unit 104, in other blocks within SoC 100, or come from external to SoC 100, coupled through power supply pins. Power management unit 104 may include one or more voltage regulators to adjust outputs of the power supplies to various voltage levels as required by functional blocks within SoC 100.

Analog/mixed-signal block 105 may include a variety of circuits including, for example, a crystal oscillator, a phase-locked loop (PLL) or frequency-locked loop (FLL), an analog-to-digital converter (ADC), and a digital-to-analog converter (DAC) (all not shown). In some embodiments, analog/mixed-signal block 105 may also include, in some embodiments, radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to select one or more clock sources for the functional blocks in SoC 100. In various embodiments, the clock sources may be located in analog/mixed-signal block 105, in clock management unit 106, in other blocks with SoC 100, or come from external to SoC 100, coupled through one or more I/O pins. In some embodiments, clock management 106 may be capable of dividing a selected clock source before it is distributed throughout SoC 100. Clock management unit 106 may include registers for selecting an output frequency of a PLL, FLL, or other type of adjustable clock source. In such embodiments, clock management unit 106 may manage the configuration of one or more adjustable clock sources and may be capable of changing clock output frequencies in stages in order to avoid a large change in frequency in a short period of time.

System bus 107 may be configured as one or more buses to couple processor 101 to the other functional blocks within the SoC 100 such as, e.g., memory block 102, and I/O block 103. In some embodiments, system bus 107 may include interfaces coupled to one or more of the functional blocks that allow a particular functional block to communicate through the bus. In some embodiments, system bus 107 may allow movement of data and transactions (i.e., requests and responses) between functional blocks without intervention from processor 101. For example, data received through the I/O block 103 may be stored directly to memory block 102.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies.

Clock Management within an SoC

Figure 2:
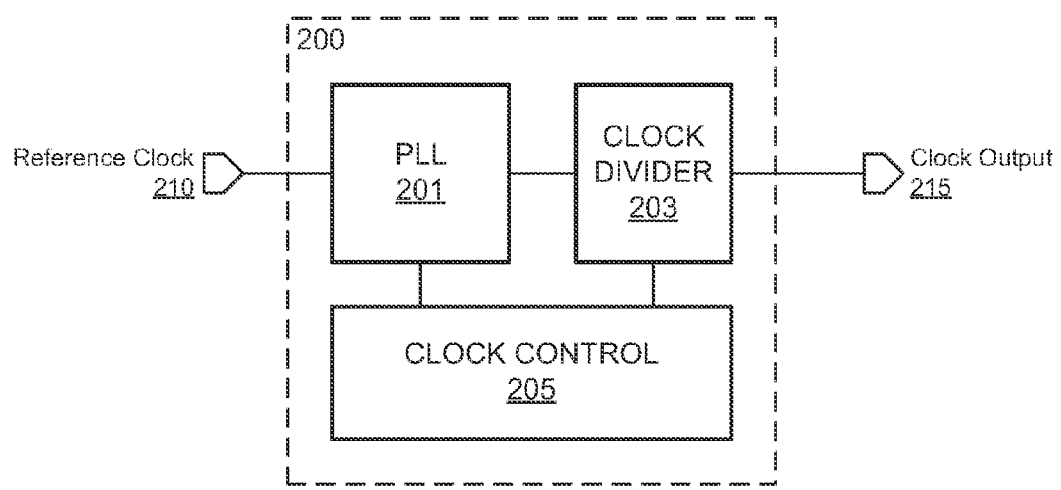
FIG. 2 illustrates an embodiment of a clock management unit.

Turning to FIG. 2, an embodiment of a clock management unit is illustrated. Clock management unit 200, in some embodiments, may correspond to clock management unit 106 in FIG. 1. Referring collectively to FIG. 1 and FIG. 2, clock management unit 200 may include PLL 201, clock divider 203, and clock control circuit 205. Various embodiments of clock management unit 200 may receive a reference clock 210 as an input and produce clock output 215 for distribution to functional blocks within SoC 100.

PLL 201 may represent a configurable clock source for SoC 100. In various embodiments, PLL 201 may be a phase-locked loop, a frequency locked loop or other suitable type of programmable clock signal generator. In some embodiments, PLL 201 may be included in clock management unit 200. In other embodiments PLL 201 may be in another block, such as, e.g., analog/mixed-signal block 105, and have control signals coupled to clock management unit 200. PLL 201 may receive reference clock signal 210 from a clock source such as, for example, a crystal oscillator, an internal oscillator, or an external clock source coupled to SoC 100 through an I/O pin. PLL 201 may be programmable to generate an output clock signal based on the reference clock but at a variety of higher frequencies. The output signal from PLL 201 may go to clock divider 203.

Clock divider 203 may be a programmable circuit capable of dividing a value of a frequency of the output signal from PLL 201 by a variety values. In some embodiments, clock divider 203 may only divide the PLL 201 output signal by powers of two (i.e., 1, 2, 4, 8, etc.). In other embodiments, clock divider 203 may divide the PLL 201 output signal by a variety of positive integer values (i.e., 1, 2, 3, 4, etc.). In further embodiments, clock divider 203 may be capable of dividing the PLL 203 output signal by a variety of fractional values (i.e., 1, 5/4, 4/3, etc.). In some embodiments, clock divider 203 may divide an input signal by using one or more flip-flop configured to toggle an output on a rising edge of the input clock signal. In other embodiments, clock divider 203 may be configured to divide an input signal by removing a number of clock pulses out of a larger number of clock pulses. In some embodiments, the output of clock divider 203, i.e., clock output 215, may be distributed to one or more functional blocks within SoC 100. In other embodiments, clock output 215 may be further processed before being utilized by other functional blocks. More details regarding clock divider 203 will be discussed below.

Clock control circuit 205 may receive commands for setting PLL 201 and clock divider 203 from a processor in SoC 100, such as, e.g., processor 101. Clock control circuit 205 may modify settings in PLL 201 and clock divider 203 to produce a requested frequency on clock output 215. In response to receiving a command to modify the frequency of clock output 215, clock control circuit 205 may increase the divisor of clock divider 203 before making any adjustments to PLL 201. The divisor may be increased to prevent PLL 201 from overclocking circuits within SoC 100 while the output frequency of PLL 201 is changed.

It is noted that in closed loop clock generating circuits, such as a PLL for example, the loop may be referred to as "locked" when the frequency is at the programmed value and stable, i.e., the frequency value is not deviating far from the set value. There may be a small degree of variance in the frequency, referred to as jitter, but the clock signal will be steady enough to support the functions of SoC 100. In order to change the frequency of the loop, the loop may enter an unlocked state in which the frequency of the clock signal varies, possibly increasing and decreasing, as the loop searches for a stable frequency, which may be the newly set frequency. The loop may settle on a new frequency in which the clock signal may again become stable. This process of the clock signal stabilizing to a new frequency may be referred to as re-acquiring lock.

While the closed loop is in the unlocked state, the frequency may temporarily increase to a value fast enough that circuits within SoC 100 may not function properly. A high speed clock that exceeds a maximum allowable frequency for a circuit may cause indeterminate behavior and possibly even a system failure. Using a clock frequency which exceeds a circuit's maximum rating may be referred to as overclocking.

To avoid overclocking SoC 100, clock control circuit 205 may increase the divisor in clock divider 203 before making any changes to PLL 201. Once the new divisor is selected, clock control circuit 205 may adjust PLL 201 to output a new frequency. Clock control circuit may wait for PLL 201 to reacquire lock. Once PLL 201 is locked, clock control circuit may increase the divisor again and wait a predetermined amount of time. After waiting a predetermined amount of time, clock control circuit may decrease the divisor in clock divider 203 and wait another predetermined amount of time. Clock control circuit may repeat the divisor decreasing step and waiting step one or more times until clock output 215 is at the desired frequency.

It is noted that the embodiment of clock management unit 200 as illustrated in FIG. 2 is merely an example. The numbers and types of functional blocks may differ in various embodiments. For example, in other embodiments, other types and numbers of clock sources may be utilized.

Figure 3:
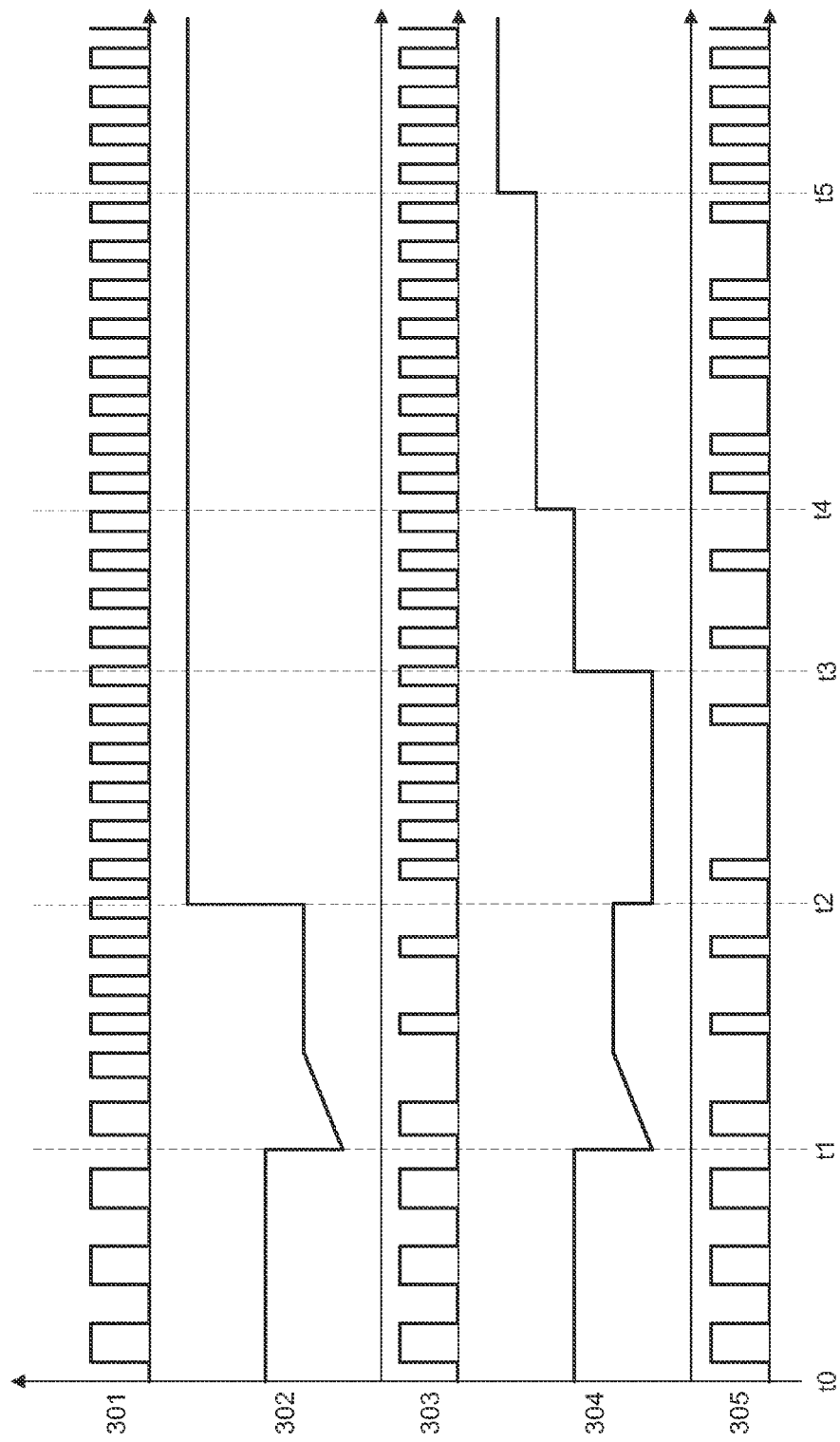
FIG. 3 illustrates possible waveforms of an embodiment of a clock management unit.

Turning to FIG. 3, example waveforms that may illustrate the operation of a clock management unit, such as, e.g., clock management unit 200 illustrated in FIG. 2, are shown. Referring collectively to the waveforms of FIG. 3 and the embodiment of FIG. 2, waveform 301 may correspond to the clock output of PLL 201. Waveform 302 illustrates a graph of clock output frequency versus time which may correspond to a first method of clock management. Waveform 303 illustrates a clock signal which may correspond to clock output 215 from clock divider 203 relative to the frequencies illustrated in waveform 302. Waveform 304 illustrates a graph of clock output frequency versus time which may correspond to a second method of clock management. Waveform 305 may correspond to clock output 215 from clock divider 203 relative to the frequencies illustrated in waveform 304.

At time t0, the waveforms may show when PLL 201 is locked and running at a given frequency. Waveforms 301, 303, and 305 may show the clock outputs running at a stable frequency. Waveforms 302 and 304 may also indicate that the frequencies of the clock outputs are stable.

At time t1, clock control circuit 205 may receive a command to increase the frequency of clock output 215. In response to the command, clock control circuit 205 may increase the divisor of clock divider 203 to reduce the frequency of clock output 215 as may be seen in waveforms 302 and 304. After the new divisor has been set, clock control circuit 205 may adjust the frequency settings of PLL 201. The output frequency of PLL 203 may ramp up to match the new setting as may be seen in waveforms 302 and 304. It is noted that while waveforms 302 and 304 show a linear increase in frequency, the actual frequency of the output of PLL 201 may rise and fall above the illustrated lines while PLL 201 reacquires lock. The increase in the frequency of the output of PLL 201 may also be seen in waveform 301 as the pulse widths get smaller, corresponding to a higher frequency. The effect of clock divider 203 may be seen in waveforms 303 and 305 where clock output 215 may have fewer clock pulses when compared to the output of PLL 201.

The clock output of PLL 201 may be locked and stable by time t2. In the first method of clock management, at time t2, clock control circuit 205 may decrease the divisor of clock divider 203 such that clock output 215 is at the desired frequency. As may be seen in waveform 302, the increase in frequency may be large and sudden. This sudden change in frequency may cause voltage droop as previously discussed and could result in an error occurring in SoC 100.

Contrary to the first method of clock management which may be seen in waveforms 302 and 303, the second method may adjust clock output 215 such that a large sudden change in frequency may be avoided. In the second method of clock management, at time t2, clock control circuit 205 may increase the divisor of clock divider 203, further reducing the frequency of clock output 215. Clock control circuit 205 may wait a predetermined amount of time, until t3, and then start to decrement the divisor of clock divider 203 to gradually increase the frequency of clock output 215. Clock control circuit 205 may repeat this process, waiting until t4 to decrement the divisor again, and waiting until t5 to set the divisor to produce the desired frequency for clock output 215. By starting from a lower frequency and increasing the frequency of clock output 215 in steps, a large sudden change in frequency can be avoided.

It is noted that FIG. 3 is merely an example of possible waveforms illustrated for demonstration purposes. Actual waveforms may vary due to specific circuit embodiments, technology used to fabricate the circuits and other factors in the operation of the system. In other embodiments, more steps or fewer steps of decrementing the divisor may be utilized to bring the frequency of clock output 215 to the desired frequency.

Method for Managing Changes to a Clock Frequency

Figure 4:
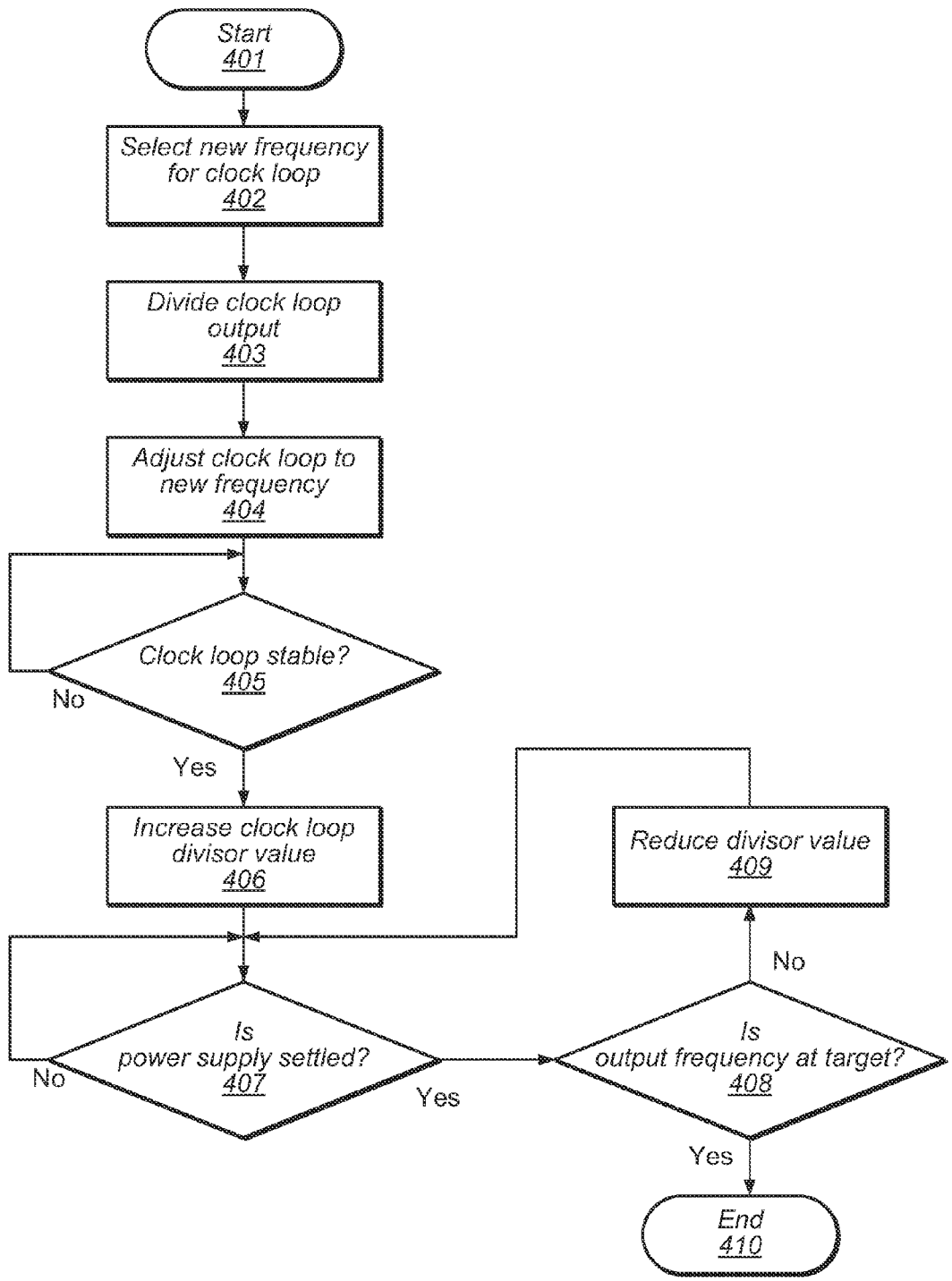
FIG. 4 illustrates a flowchart of an embodiment of a method for managing a change in a clock signal frequency.

Turning to FIG. 4, a flow chart for a method for controlling changes to a clock frequency is illustrated. The method may be used for a clock management circuit such as, e.g., clock management unit 200 in FIG. 2. Referring collectively to SoC 100, clock management unit 200, and the flowchart in FIG. 4, the method may begin in block 401. Clock management unit 200 may enter the method with PLL 201 in a locked state and clock output 215 set for a frequency lower than the maximum it is capable of providing.

Clock management unit 200 may receive a command to set a new frequency for clock output 215 (block 502). The command may come from a processor in SoC 100, such as processor 101. The command may be received in the form of new values being written to registers within clock control circuit 205. In other embodiments, the registers may be within PLL 201 and control signals from PLL 201 may be asserted to clock control circuit 205 to indicate a requested change in the settings of PLL 201.

In response to the command to set a new frequency, clock control circuit 205 may increase the value of the divisor in clock divider 203 (block 403). In some embodiments, clock control circuit may always use the same factor for dividing the frequency of clock output 215 when a command to set a new frequency is received. For example, the divisor value may always be increased by a factor of two (i.e., dividing the current frequency by two). In other embodiments, the divisor value may be set dynamically, based upon the current settings, and in further embodiments, the divisor value may be determined by a combination of the current settings and the new settings.

Once the new divisor value has been set, then clock control circuit 205 may configure PLL 201 for the new frequency (block 404). In some embodiments, clock control circuit 205 may configure PLL 201 by writing to one or more registers within PLL 201, or in other embodiments, by asserting control signals coupled to PLL 201. Upon the settings being changed, PLL 201, may become unlocked from the current frequency and begin to re-acquire lock to the new frequency.

The method may now depend upon the state of PLL 201 (block 405). Clock control circuit 205 may wait for PLL 201 to reacquire lock to the new frequency before continuing. In other embodiments, clock control circuit may not wait for PLL 201 to lock to the new frequency, but instead wait a predetermined amount of time. If PLL 201 has locked to the new frequency, the method may move to block 406. Otherwise, the method may remain in block 405 until PLL 201 has locked.

Once PLL 201 has locked to the new frequency, clock control circuit 205 may increase the value of the divisor again (block 406). In some embodiments, clock control circuit may always use the same factor for dividing clock output 215 when PLL 201 locks to a new frequency. In other embodiments, the divisor value may be set dynamically, based upon a combination of the current settings and the new settings. In one embodiment, if the new frequency of clock output 215 is less than the frequency at the beginning of the method, then clock control circuit 205 may decrease the divisor value instead of increasing it.

The method may depend upon a status from a voltage regulator or power supply within SoC 100, such as, for example, from power management unit 104 (block 407). Clock control circuit 205 may wait until power management unit 104 has settled. If power management unit 104 has settled, the method may move to block 408. Otherwise, the method may wait in block 407 until power management unit has settled.

As discussed previously, a power supply signal, such as may be received from a voltage regulator, may experience a temporary voltage droop in response to a sudden increase in the frequency of a clock coupled to circuits to which the voltage regulator is supplying power. The same power supply signal may experience a temporary boost in the voltage level in response to a sudden decrease in the frequency of the coupled circuits. Power management unit 104 may assert a signal to indicate that an included voltage regulator has a stable output. In other embodiments, power management unit 104 may not indicate if an included voltage regulator is stable or not. If power management unit 104 does not provide any indications of stability, then clock control circuit 205 may wait a predetermined amount of time. In some embodiments, the predetermined amount of time may be fixed by the design of SoC 100, and in other embodiments, the amount of time may be configurable and dependent upon criteria such as, for example, the current frequency of clock output 215, current voltage level of an external power supply (e.g. a battery voltage), a current temperature measurement, or any combination thereof.

Once the power supply signal from power management unit 104 has settled, the method may determine if the current frequency of clock output 215 is equal to the desired frequency (block 408). If the desired frequency has been reached, then then method may end in block 410. Otherwise, if more steps are required to reach the desired frequency, then the method may move to block 409 to begin the next step.

Clock control circuit 205 may reduce the divisor value in clock divider 203 to increase the frequency of clock output 215 (block 409). If the new frequency is lower than the starting frequency, then clock control circuit may increase the divisor value to lower the frequency of clock output 215. After changing the divisor value for clock divider 203, the method may move back to block 407 to wait for the power supply signal from power management unit 104 to settle. After the power supply signal settles, the method may move back to block 408 to determine if the desired frequency has been reached. Blocks 409, 407, and 408 may be repeated until the desired frequency has been reached.

It is noted that the method illustrated in FIG. 4 is merely an example embodiment. Variations on this method are possible, such as, for example, although the method in FIG. 4 illustrates operations occurring in series, some or all of the operations may be performed in parallel or in a different sequence. In some embodiments, additional operations may be included.

The effects of the different divisor values may be seen in waveform 305 by way of the removed clock pulses when compared to waveform 301. In some embodiments, clock divider 203 may divide an input signal by removing a number of pulses in a periodic pattern as may be seen in waveform 305. In other embodiments, clock divider 203 may divide an input signal by scaling the pulse widths of the input signal Clock Divider Circuit Moving now to FIG. 5, a block diagram is illustrated for an embodiment of a clock management unit. The illustrated clock management unit in FIG. 5 may include PLL 501, clock control 505 and clock divider 520. Clock divider 520 may, in some embodiments, correspond to clock divider 203 in FIG. 2, and may include pulse counter 521, pattern storage register 523 and pulse removal unit 525. PLL 501 may receive a reference clock 510 as an input and pulse removal unit 525 may produce clock output 515 for distribution to functional blocks within a computing system such as, e.g., SoC 100.

PLL 501 may, in some embodiments, correspond to PLL 201 in FIG. 2 and may include features as discussed above for PLL 201. The output of PLL 501, PLL output 512, may be coupled to pulse counter 521 and pulse removal unit 525.

In some embodiments, clock control 505 may correspond to clock control circuit 205 in FIG. 2 and may perform functions similar to clock control circuit 205 as disclosed above. Clock control circuit may be coupled to PLL 501, pulse counter 521 and pattern storage register 523. Clock control circuit 505 may send a value to pulse counter 521 that may correspond to a number of pulses of PLL output 512 that comprise one period of a pattern to be repeated. Clock control circuit 505 may also send a pattern in the form of a string of logic ones and zeroes to pattern storage register 523. In some embodiments, a 'logic zero' (or 'zero') value may correspond to a voltage level at or near ground potential and a 'logic one' (or 'one') value may correspond to a voltage level sufficient to turn-on an n-channel metal-oxide semiconductor field-effect transistor (MOSFET) and turn-off a p-channel MOSFET. Different voltage levels may be used for the different logic levels in other embodiments.

Pulse counter 521 may receive PLL output 512 as an input signal. Pulse counter 521 may increment a count for each rising edge or falling edge of PLL output 512. In other embodiments, pulse counter 521 may decrement a count instead of incrementing. The value received from clock control circuit 505 may correspond to a terminal count value. When the count matches the terminal count value, pulse counter 521 may, in some embodiments, assert a signal to pulse removal unit 525. In other embodiments, the asserted signal may be sent to pattern storage register 523 and in other embodiments both pattern storage register 523 and pulse removal unit 525 may receive the asserted signal. In response to the count matching the terminal count value, pulse counter 521 may also reset the count back to zero or to another initial value.

Pattern storage register 523 may receive the pattern from clock control counter 505 in the form of a string of ones and zeroes. In various embodiments, pattern storage register 523 may store the pattern in a register, in RAM, or in any other suitable storage medium. Pattern storage register 523 may be coupled to pulse removal unit 525. In some embodiments, pattern storage register 523 may send a copy of the stored pattern to pulse removal unit 525 as a single string. In other embodiments, pattern storage register 523 may send the pattern to pulse removal unit 525 one bit at a time. In the latter case, pattern storage register may store the pattern in a shift register such that a next bit in the pattern may be shifted out to pulse removal unit 525.

Pulse removal unit 525 may be configured to receive PLL output 512 and remove a number of pulses as determined by the pattern received from pattern storage register 523. In some embodiments, removing a pulse may correspond to blocking or masking a zero-to-one transition from PLL output 512. For example, referring to waveform 301 and waveform 305 in FIG. 3, in which waveform 301 may represent PLL output 512 and waveform 305 may represent clock output 515. In this example, three pulses of PLL output 512 are removed from clock output 515 between times t1 and t2, corresponding to a pattern in which every other PLL output clock pulse is removed. Between times t4 and t5, two pulses are removed from clock output 515 in a pattern which removes the third pulse of every four pulses.

Pulse removal unit 525 may utilize logic circuits to remove pulses from PLL output 512. For example, pulse removal unit may combine PLL output 512 and a next bit of the pattern using a logic AND function, such that zero-to-one transitions are masked if the pattern bit is zero and the transition is passed through if the pattern bit is a one. In other embodiments, pulse removal unit 525 may mask a one-to-zero transition of PLL output 512 rather than a zero-to-one transition. In such an embodiment, a logic OR function may be used to combine the pattern bit with PLL output 512 such that the zero-to-one transition is masked if the pattern bit is a one and the transition passes through if the pattern bit is a zero. Many methods of modifying a clock signal with a given pattern are known and any suitable method may be utilized by pulse removal unit 525.

Pulse removal unit 525 or pattern storage register 523 may receive an asserted signal from pulse counter 521 if the value in pulse counter 521 matches a current pulse count. In response to the asserted signal, pulse removal unit 525 may or pattern storage register 523 may restart the pattern. For example, if pulse removal unit 525 is currently using the fifth bit of the pattern in pattern storage register 523 and the signal from pulse counter 521 is asserted, then pulse removal unit 525 may use the first bit of the pattern for the next pulse of PLL output 512, followed in order by the second bit of the pattern, third bit of the pattern and so on until the signal from the pulse counter is asserted again. This process may repeat until a new value is stored in pulse counter 521 or a new pattern is stored in pattern storage register 523.

In some embodiments, additional circuitry (not shown) in clock divider 520 may modify clock output 515. Such modifications to clock output 515 may include, e.g., adjustments to the frequency or duty cycle of clock output 515. For example, clock output 515 may be input into a circuit that produces an output signal with a 50% duty cycle or other suitable duty cycle. Such additional circuitry may, in various embodiments, produce an output signal with a lower frequency than clock output 515 while, in other embodiments, the frequency of the output signal may be the same of the frequency of clock output 515.

Figure 5:
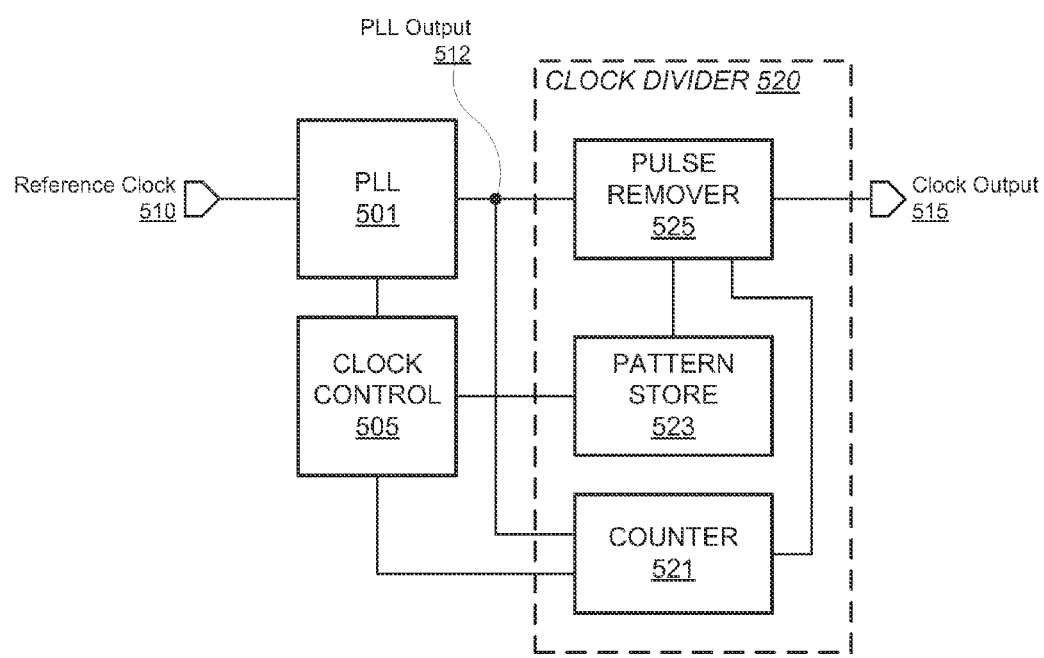
FIG. 5 illustrates another embodiment of a clock management unit.

It is noted that the embodiment of the clock management unit as illustrated in FIG. 5 is merely an example. The numbers and types of functional blocks may differ in various embodiments. For example, in other embodiments, clock divider 520 may be composed of different types and different numbers of functional blocks.

Method for Dividing a Clock Signal

Figure 6:
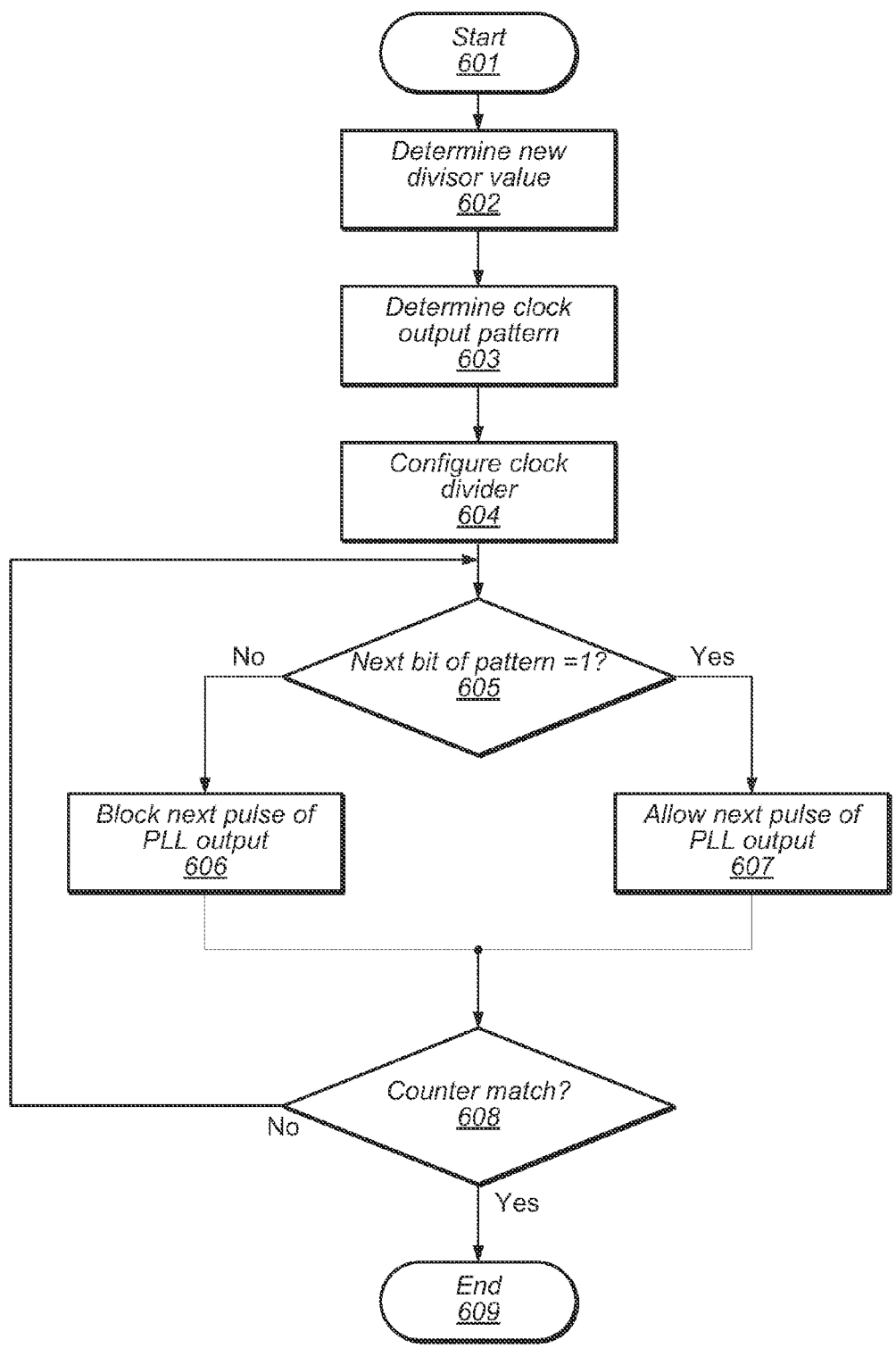
FIG. 6 illustrates a flowchart of an embodiment of a method for dividing a clock signal.

Turning to FIG. 6, a method is illustrated for dividing a frequency of a clock signal, such as, for example, PLL output 512 in FIG. 5. FIG. 6 may in some embodiments, correspond to block 403, block 406, or block 409 in FIG. 4. Referring collectively to the waveforms in FIG. 3, the block diagram in FIG. 5, and the flowchart in FIG. 6, the method may begin in block 601.

Clock control circuit 505 may determine a new divisor value for PLL output 512 (block 602). Clock control circuit may increase the divisor value as a part of block 403 or block 406 in the method illustrated in FIG. 4. Clock control circuit 505 may decrease the divisor value as a part of block 409 in the method illustrated in FIG. 4.

In response to determining the new divisor value, clock control circuit 505 may determine a pattern for removing clock pulses from PLL output 512 (block 603). To divide PLL output 512 by any divisor greater than one, clock divider 520 may remove clock pulses from PLL output 512. Clock control 505 may determine a pattern for removing clock pulses. A particular pattern may be selected based on one or more criteria, including a previous divisor value, a previous divisor pattern, the new divisor value, the current clock frequency, a current operating mode of SoC 100, or any other suitable criteria.

The pattern for removing clock pulses refers to which clock pulses will be removed from PLL output 512. For example, waveform 305 in FIG. 3 between times t2 and t3 may show an example of dividing waveform 301 by four. In this example, the divide-by-four pattern may allow the first full clock pulse after time t2 and then block the next three clock pulses. Another possible divide-by-four pattern may allow the second clock pulse and block the first, third and fourth pulses. Alternatively, the third pulse or fourth pulse may be allowed. In another example, waveform 305 may illustrate dividing waveform 301 by 4/3 between times t4 and t5. The pattern in this example may allow the first, second and fourth clock pulses and block the third clock pulse. Other possible patterns may block the first, or second or fourth clock pulse instead of the third clock pulse.

Once a pattern has been determined, clock control circuit 505 may configure clock divider 520 with the determined pattern (block 604). The pattern may be a string of zeroes and ones where a zero indicates when to block, i.e., mask, a clock pulse and a one indicates when to allow a clock pulse to pass through to clock output 515. In other embodiments, the ones and zeroes may have opposite indications. In some embodiments, clock control circuit 505 may store the string of bits in pattern storage register 523 and store a pattern count in pulse counter 521. In other embodiments, various other circuits may be programmed to implement the determined pattern.

The method may now depend on the value of the next bit in the string (block 605). Bits stored in pattern storage 523 may be read one at a time to determine if the next clock pulse should be allowed or blocked. In some embodiments, if the next bit is a zero, the method may move to block 606 to mask the next clock pulse and if the next bit is a one, the method may move to block 607 to allow the next clock pulse to pass through to clock output 515. In other embodiments, the logic may be reversed such that a one masks the next clock pulse and a zero allows a clock pulse to pass through.

If the read pattern bit is a zero, then clock divider 520 may mask the next clock pulse of PLL output 512 (block 606). In some embodiments, logic in clock divider 520 may perform an AND function between PLL output 512 and the read bit. In various embodiments, other forms of logic circuits may be used to mask the clock pulse.

If the read pattern bit is a one, then clock divider 520 may allow the next clock pulse of PLL output 512 to pass through to clock output 515 (block 607). As stated above, in some embodiments, logic in clock divider 520 may perform a logical AND function between PLL output 512 and the read bit. In various other embodiments, other forms of logic circuits may be used to allow the clock pulse to pass through to clock output 515.

After the read pattern bit has either masked or allowed the respective clock pulse, the method may depend on the current counter value in pulse counter 521 (block 608). Pulse counter 521 may increment with each clock pulse of PLL output 512. If the current count value matches a terminal count value set by clock control circuit 505, then the method may end in block 609. Otherwise, the method may return to block 605 to read the next bit of the pattern. The terminal count value may equal the number of bits in the pattern, such that when the terminal value is reached by the counter value, the pattern has completed one cycle. In some embodiments, once the terminal value has been reached, the method may end at which point the clock control circuit may reset and begin the method again.

It is noted that the method illustrated in FIG. 6 is merely an example embodiment. Variations on this method are possible, such as, for example, some or all steps in the method may be repeated to create a continuous clock output 515 until a new divisor value is determined. In some embodiments, additional or fewer steps may be included.

Numerous variations and modifications will become apparent to those skilled in the art once the above disclosure is fully appreciated. It is intended that the following claims be interpreted to embrace all such variations and modifications.

What is claimed is:

1. A system, comprising:
   a clock generator configured to generate a clock signal, wherein a frequency of the clock signal has an initial frequency value;
   a clock divider coupled to the clock generator, wherein the clock divider is configured to divide the frequency of the clock signal by a divisor value;
   a processor coupled to the clock divider, wherein the processor is configured to select a new frequency value for the clock signal; and
   a clock management unit, configured to:
     increase the divisor value in response to the processor selecting the new frequency value;
     adjust the frequency of the clock signal to the new frequency value selected by the processor; and
     adjust the divisor value in a series of adjustments in response to a determination that the frequency of the clock signal has stabilized at the new frequency value, wherein at least a predetermined time period elapses between each adjustment of the series of adjustments.

2. The system of claim 1, wherein the new frequency value is greater than the initial frequency value.

3. The system of claim 2, wherein to adjust the divisor value in the series of adjustments, the clock management unit is further configured to increase the divisor value in a first adjustment of the series of adjustments.

4. The system of claim 3, wherein to adjust the divisor value in the series of adjustments, the clock management unit is further configured to decrease the divisor value in subsequent adjustments of the series of adjustments.

5. The system of claim 1, wherein the clock management unit is further configured to determine a number of adjustments in the series of adjustments dependent upon a difference between the new frequency value and the initial frequency value.

6. The system of claim 1, wherein the clock signal includes a plurality of clock pulses, and wherein to divide the frequency of the clock signal by a divisor value, the clock divider is further configured to remove a first number of clock pulses from the plurality of clock pulses during a given one of the plurality of time periods.

7. The system of claim 6, wherein to remove the first number of clock pulses from the plurality of clock pulses, the clock divider is further configured to determine a pattern for removing the first number of clock pulses dependent upon a previously determined pattern.

8. A method, comprising:
   generating, by a clock source, a clock signal, wherein a frequency of the clock signal has an initial value;
   dividing, by a clock divider circuit, the frequency of the clock signal by a divisor value in response to a request for a new value for the frequency;
   adjusting, by the clock source, the frequency of the clock signal to the new value; and
   adjusting, by the clock divider circuit, the divisor value in a series of adjustments, in response to a determination that the frequency of the clock signal has stabilized at the new value, wherein at least a predetermined time period elapses between each adjustment of the series of adjustments.

9. The method of claim 8, wherein the new value for the frequency is greater than the initial value for the frequency.

10. The method of claim 9, wherein adjusting the divisor value by the series of adjustments further comprises increasing the divisor value in a first adjustment of the series of adjustments and decreasing the divisor value in subsequent adjustments of the series of adjustments.

11. The method of claim 8, wherein adjusting the divisor value by the series of adjustments further comprises determining a number of adjustments in the series of adjustments dependent upon a difference between the new value for the frequency of the clock signal and the initial value for the frequency of the clock signal.

12. The method of claim 8, wherein the clock signal includes a plurality of clock pulses, and wherein dividing the new value of the frequency of the clock signal comprises removing a first number of clock pulses from the plurality of clock pulses during a given one of the plurality of time periods.

13. The method of claim 12, wherein removing the first number of clock pulses from the plurality of clock pulses, comprises determining a pattern for removing the first number of clock pulses dependent upon a previously determined pattern.

14. An apparatus, comprising:
   a clock circuit, configured to generate a clock signal, wherein a frequency of the clock signal has a first value;
   a frequency divider, coupled to the clock circuit, wherein the frequency divider is configured to divide the frequency of the clock signal by a divisor; and
   a clock control unit, configured to:
     increase the divisor in response to selecting a second value for the frequency of the clock signal;
     adjust the frequency of the clock signal to the second value; and
     adjust the divisor in a series of adjustments in response to a determination that the frequency of the clock signal has stabilized at the second value, wherein at least a predetermined time period elapses between each adjustment of the series of adjustments.

15. The apparatus of claim 14, wherein the second value is less than the first value.

16. The apparatus of claim 15, wherein to adjust the divisor in the series of adjustments, the clock control unit is further configured to decrease the divisor in a first adjustment of the series of adjustments and to increase the divisor in subsequent adjustments of the series of adjustments.

17. The apparatus of claim 14, wherein the clock control unit is further configured to determine a number of adjustments in the series of adjustments dependent upon a difference between the second value and the first value.

18. The apparatus of claim 14, wherein the clock signal includes a plurality of clock pulses, and wherein to divide the frequency of the clock signal by a divisor, the frequency divider is further configured to remove a first number of clock pulses from the plurality of clock pulses during a given one of the plurality of time periods.

19. The apparatus of claim 18, wherein to remove a first number of clock pulses from the plurality of clock pulses, the frequency divider is further configured to determine a pattern for removing the first number of clock pulses dependent upon a previously determined pattern.

20. The apparatus of claim 14, wherein to adjust the divisor in the series of adjustments, the clock control unit is further configured to select a number of adjustments in the series of adjustments dependent upon a voltage level of a power source coupled to the clock circuit.

* * * * *